July 4, 1972     D. EPPLER     3,674,392

EXTRUSION TOOL

Filed Oct. 20, 1969     2 Sheets-Sheet 1

INVENTOR.
DANIEL EPPLER

BY

ATTORNEY

INVENTOR.
DANIEL EPPLER

BY

ATTORNEY

United States Patent Office 3,674,392
Patented July 4, 1972

3,674,392
EXTRUSION TOOL

Daniel Eppler, Nutley, N.J., assignor to Thomas & Betts Corporation, Elizabeth, N.J.
Filed Oct. 20, 1969, Ser. No. 867,652
Int. Cl. B29f 3/00
U.S. Cl. 425—109           11 Claims

ABSTRACT OF THE DISCLOSURE

An extrusion tool consists of a housing having therethrough a longitudinal passage in which is placed, at one end, one or more protrusions or protruding surfaces. A transverse passage extends through the housing into the longitudinal passage for the introduction of articles within the longitudinal passage and an end opening and/or slot permits the insertion of additional articles into the longitudinal passage and within the first mentioned article to permit coupling to take place therebetween. Fitted within the longitudinal passage is a plunger activated from a manual, movable handle mounted to both the plunger and the housing for movement of the plunger toward and away from the protrusions within the longitudinal passage.

Movement of the plunger towards the protrusions extrudes the first mentioned article about second articles also inserted within the longitudinal passage. Varying extrusion shapes may be accomplished by shaping the cross-section of the longitudinal passage or by the shape and number of the protrusions placed therein.

BACKGROUND OF THE INVENTION

Field of the invention

The invention finds utility in the placement of articles such as connectors or similar articles upon elongated members such as conductors, tubes, rods or the like. For example, if it is desired to join a conductor to a pin of a multi-pin connector, a connector may be fastened about the pin at the same time as a conductor is fastened to said pin by the connector.

DESCRIPTION OF THE PRIOR ART

In the prior art, the most widely used method for applying connectors to conductors without employing solder is to deform or crimp the connector to the conductors. Conductors having their insulation stripped therefrom are slid within the wire barrel of a connector; the connector is then positioned between the opened dies, which are required to crimp or mechanically deform the connector about the conductors. Depending upon the size of the dies, that is, their length and width with respect to the crimp connection to be achieved, only a small portion of the metal of the conductor and of the connector are brought into engagement with one another. Further, such crimping causes a great increase in the mechanical and electrical stress of the conductors and insulation of the connector and conductors as well. Further, the degree of cold metal flow and insulation flow taking place during the crimping operation makes an uneven mechanical connection between the conductor and the connector which may also change the electrical properties of the insulation therebout.

SUMMARY OF THE INVENTION

The present invention seeks to overcome the difficulties noted above with respect to prior art crimping tools by providing an extrusion tool which will provide a uniform attachment of an article such as a connector to other articles, such as conductors and will uniformly distribute the stresses within the connector and conductor both as to the metal portions and insulators. Further, the degree of connection which is achievable by the present tool extends over the length of the entire connector as well as increasing the ability of the connector to hold the conductor, improving the electrical properties of the joint.

These results are achieved by employment of an extrusion tool having a housing member with a longitudinal passage extending therethrough. In a first end of the longitudinal passage are placed one or more protrusions or protruding sections which extend from the walls defining the longitudinal passage and partially blocking the longitudinal passage. Fitted within the longitudinal passage and moved toward and away from the protrusions is a plunger coupled to a movable handle also movably mounted to the housing. In a retracted position, that is, with the plunger removed from the protrusions, an article, such as a connector, may be placed through a transverse passage extending from the outer surface of the housing into the longitudinal passage between the plunger and the protrusions. Further, a second article, such as a conductor from which the insulation has been removed from a portion thereof, may then be inserted through an aperture within the end of the housing which communicates with the longitudinal passage or from a slot extending from the outer surface of the housing into the longitudinal passage and also cooperating wtih the transverse passage. The operation of the plunger will extrude the connector through the protruding area of the longitudinal passage having the protrusions therein, extruding the connector about the conductor. Depending upon the shape of the connector to be employed, the conductors employed and any other member such as terminal pins to be employed with the tool, the number and positioning of the protrusions or protruding surfaces on the inside of the longitudinal passage may be varied, as may be the shape of the longitudinal passage itself. Because of the extrusion technique employed, the resulting cold flow of both connector and conductor provides a uniform, even connection with maximum holding power and minimum destruction of the insulation thereabout. It is therefore an object of this invention to provide an improved tool for coupling two articles.

It is still another object of this invention to provide an improved extrusion tool for the placement of connectors about conductors.

It is still another object of this invention to provide an improved extrusion tool for the application of connectors to conductors in such a manner as to provide uniform distribution of stresses both within the materials of the connector and the insulation thereof.

It is still another object of this invention to provide a tool for extruding a connector to a conductor which is simple and requires little force to operate.

Other objects and features of the invention will be pointed out in the following description and claims and illustrated in the accompanying drawings, which disclose, by way of example, the principles of the invention, and the best modes which have been contemplated for carrying them out.

DESCRIPTION OF THE PREFERRED EMBODIMENTS

Figure 1:
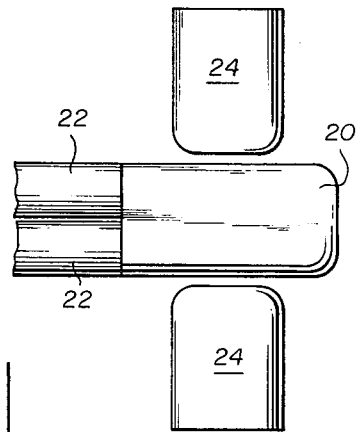
FIG. 1 is a side elevation of a prior art connector placed about two conductors and positioned within the dies of a prior art crimping tool.
Figure 2:
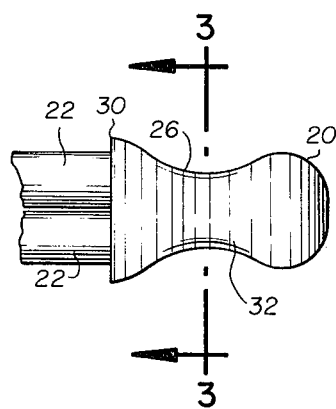
FIG. 2 is a side elevation of the connector of FIG. 1 after same has applied to the two connectors by the dies of FIG. 1.
Figure 3:
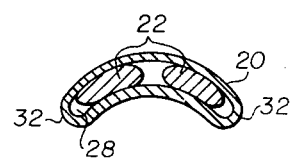
FIG. 3 is a front elevation in section of a section of the connector of FIG. 2 taken along the lines 3—3.

Turning now to FIGS. 1, 2 and 3 there is shown a prior art method of assembling a connector 20 to two conductors 22 by means of a pair of crimping dies 24. As can be seen in FIG. 1 the crimping dies 24 are generally not as long as the connector 20 and thus when the dies 24 are closed upon the connector 20 and the conductors 22 by suitable tool means (not shown) deformation of the conductors 22 and the connector will take place in a central region as at 26 (in FIG. 2). This will take place not only along the length of the connector 20 as is shown in FIG. 2 but along the width thereof as is better seen in FIG. 3. Due to the limitations of contact of the dies 24 and the connector 20 crimping action will only take place along a portion of the overall width of connector 20 and will thus leave voids such as 28 shown in FIG. 3. These voids provide no contact at all with the conductors 22 and therefore essentially contact is only achieved along the upper and lower surface of the connector 20 where they contact the conductors 22. Further, should any squirming of the conductors 22 occur during crimping a very minimum amount of contact exists between the conductors 22 and the connector 20 permitting easy separation of the conductors 22 from the connector 20. Further, because of the shape of the crimping die there is uneven crimping force exerted along the length and the width of the connector 20 depending upon the position of the conductors 22 within the connector 20 at the time of crimping. Also, the connector end as at 30, as shown in FIG. 2 has a tendency to bow out and thus provides a sharp edge for the possible injury of the insulation of neighboring conductors. The bulging out of the connector end 30 and of the head of connector 20 generally, as well as along the edges 32 as is shown in FIG. 3, generally increases the overall size of the connection made.

Figure 4:
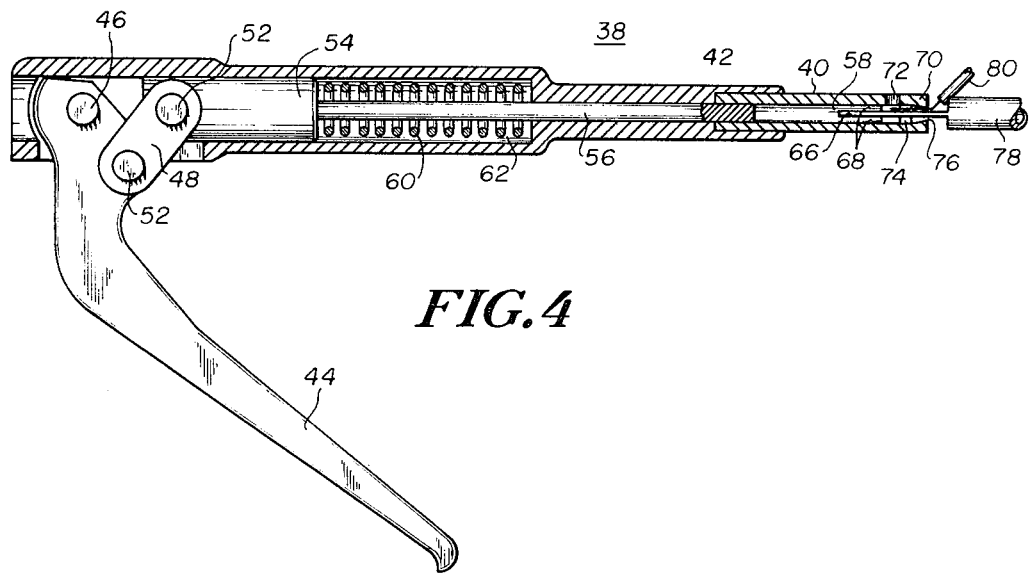
FIG. 4 is a side elevation, in section, of an extruding tool constructed in accordance with the concepts of the invention.

Turning now to FIG. 4 there is shown an extrusion tool for joining together two articles, for example, a connector 74 to a conductor 80 and pin 78. Extrusion tool 38 has a longitudinal passage 42 passing through its entire length. Movable handle 44 is coupled to the housing 40 as at pivot 46 and is coupled by means of a link 48 pivoted as at 50 and at 52 to a ram 54. Ram 54 carries with it a shaft 56 which terminates in a plunger 58. The return compression spring 60 positioned in a chamber 62 extends in parallel with the longitudinal passage 42 such that movement of the ram 54 to the right of the FIG. 4 causes the return compression spring 60 to be compressed within the chamber 62 and upon the release of the handle 44 causes the return of the ram 54 to its initial position to the left as is shown in FIG. 4. The plunger 58 is bifurcated as at 66 to provide two separate end portions 68. At the end of the longitudinal passage 42 are protrusions 70 which extend into and partially block the longitudinal passage 42. Transverse passageway 72 extends from the outer surface of the housing 40 into the longitudinal passage 42 to permit the introduction of an article such as a connector within the longitudinal passage 42 between the protrusions 70 and the plunger end portions 68. A connector such as 74 may be inserted through the transverse passage 72 and a conductor may also be inserted through the transverse passage 72 into the connector 74 and the connector 74 caused to extrude about the conductor. As is shown in FIG. 4 an aperture 76 is provided in the end of the housing 40 communicating with the longitudinal passage 42. Once a connector 74 has been positioned within the longitudinal passage 42 a pin 78 and a conductor 80 will be inserted through the aperture 76 and into the connector 74 to be joined by the extruding action of the tool 38. It should be understood that although a manual tool 38 has been shown movable handle 44 may be driven from a powered source such as a hydraulic, or pneumatic, or mechanical activator. Alternatively, the movable handle may be eliminated entirely by coupling such an actuator directly to the plunger 58.

In operating the tool 38 handle 44 is initially in the position shown in FIG. 4 moved there by spring 60 and a connector 74 is inserted through the transverse passage 72 into the longitudinal passage 42. The pin 78 and the bared portion of a conductor 80 are then inserted through the aperture 76 into the longitudinal passage 42 and into the connector 74. If it is desired to use an insulation piercing connector instead of the described connector 74 the step of stripping the insulation from conductor 80 may be omitted and an insulated conductor 80 may be directly placed in the connector. Movable handle 44 is then moved towards the housing 40 of the tool 38 which transmits the closing force via the link 48 to the ram 54 thus causing the ram 54 to move to the right of FIG. 4. As it moves it compresses the return compression spring 60 within the chamber 62 and moves the plunger 58 and the plunger end portion 68 towards the protrusions 70 in the longitudinal passage 42. The plunger end section 68 having engaged the connector 74, it will be urged along the protrusion 70 tightly extruding about the pin 78 and the conductor 80 and finally emerge from the aperture 76 at the right hand portion of the tool 38 in FIG. 4. Because the connector 74, the conductor 80 and the pin 78 can only be removed from tool 38 by passing through aperture 76, it is not possible to produce an incomplete joint and the necessity for a complex full stroke compelling mechanism is eliminated. Pressure will then be removed from the movable handle 44 allowing the return compression spring 60 which has been compressed within the chamber 62 to force the ram 54 to the left of the figure returning the plunger 58 to the left and moving the movable handle 44 to the open position as is shown in FIG. 4.

Figure 5:
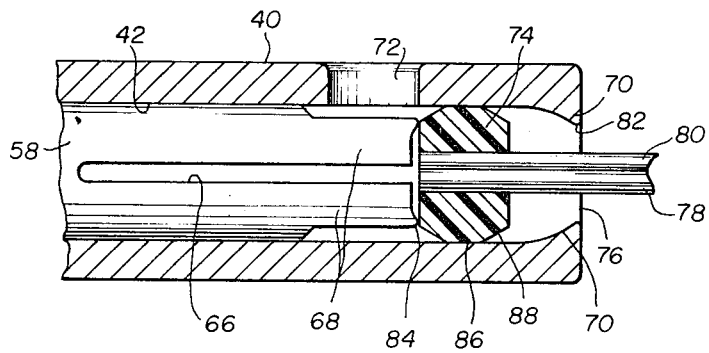
FIG. 5 is a side elevation, in section, of the muzzle portion of the tool shown in FIG. 4.

Turning now to FIG. 5 additional details of the tool 38 may be appreciated. Longitudinal passage 42 is circular in cross-section and has protrusions 70 formed in the form of an inclined plane along the entire inner circumference of the longitudinal passage 42. The ends of the protrusion as at 82 are rounded so that the external surface of the connector 74 when same is extruded through the aperture 76 will be completely smooth. The plunger ends 68 are tapered as at 84 so that they can easily follow the contour of the protrusions 70 as the plunger 58 travels towards the right of FIG. 5. The reasons for the bifurcation 66 of the plunger 58 is now evident. As the plunger 58 continues to the right hand portion of the FIG. 5 it will be necessary for the overall cross-sectional dimension of the plunger 58 to be reduced in order that the plunger may completely force the connector 74 along the protrusions 70 and through the aperture 76. In addition to bifurcation, the plunger 58 may be cross-cut as with a chuck or made of a resilient material such as rubber or plastic that can conform to the longitudinal passage 42 contour. Engagement of the tapered ends 84 of the plunger end portions 68 permit the plunger end portions 68 to respond to the contour of the protrusions 70 and thus decrease, as is necessary, the overall cross-sectional area of the plunger end portions 68. Connector 74 is shown to have relatively flat central portion 86 and tapered leading and trailing shoulders 88. The leading end trailing shoulders 88 being tapered permits the connector 74, regardless of the orientation of the connector 74 within the longitudinal passage 42, to be advanced as far along the protrusions 70 as is possible and thus minimizing the amount or work which is required to extrude the connector 74 to the pin and conductor 80 and also so minimizing the amount of insulation which must be removed from the conductor 80 prior to its insertion within the connector 74 within the tool 38. The external shape of the connector 74, however, is unimportant with respect to the operation of the tool 38 as long as the connector 74 can be accommodated within the longitudinal passage 42. As the plunger 58 moves towards the right of FIG. 5, the plunger end portions 68 will force the connector 74 to extrude through the constricted passage created by the protrusions 70 or will extrude the material of the connectors 74 along the conductor 80 and the pin 78 until all are able to pass through the aperture 76 at the end of the housing 40.

Figure 6:
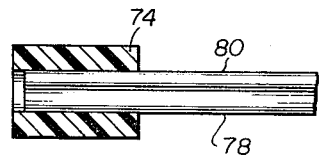
FIG. 6 is a side elevation, partially in section, of a connector placed upon two conductors by the tool of FIG. 4.

As is shown in FIG. 6 the connector 74 has extruded uniformly along the pin 78 and the conductor 80 has a length greater than the length of the original connector 74 as is shown in FIG. 5. As a result the extrusion gives an equal clamping force about the entire length of the connector 74 adhering closely to the surfaces of the conductor 80 and pin 78 and leaving no voids as is true of prior art device. Further, the extrusion provides a longer area of contact between the connector 74, the pin 78 and the conductor 80. It provides a smooth external surface of smaller dimension than the greatest dimension of the connector 74 prior to application. Further, the tool 38 has a lower peak force than would be required for conventional crimping tools to connect the same objects, due to the constant rate of work. The area of the extruded connection is the same along the entire length of the connector 74 and will hold the conductor 80 and the pin 78 with a uniform force along its entire length. Additionally, the extrusion action is self adjusting when the objects to be connected are husky, then the extrusion thickness over the length of the objects will be thinner and the binding area will be longer. However, if the objects are slender then the binding material is thicker but of a shorter length.

Figure 7:
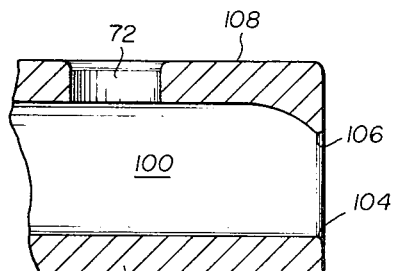
FIG. 7 is a side elevation, in section, of a modified form of a muzzle of the tool of FIG. 4.
Figure 8:
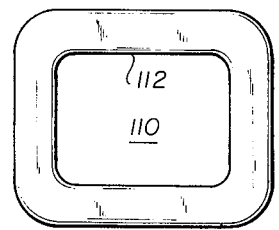
FIG. 8 is a front elevation of the muzzle of the modified form of the tool of FIG. 4.
Figure 9:
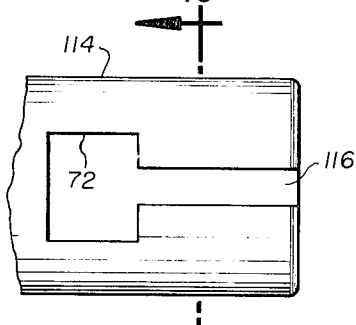
FIG. 9 is a top plan view of a modification of the muzzle of the tool of FIG. 4.

If it is desired only to extrudate along a portion of the longitudinal passage 100, of FIG. 7, then protrusions 106 may be made to depend only from the upper housing portion 108 while the lower housing portion 102 has no such protrusions. In this manner extrusion will occur in the upper portion of the connector placed within the longitudinal passage 100. Rounded edges as at 104 and 106 are provided to give the extruded connector a smooth outer surface. Additionally, if desired, an overall rectangular longitudinal passage 110 as is shown in FIG. 8 may be employed. Extruding surfaces (not visible in the figure) may then be placed upon any one of the four sides 112 which bound the longitudinal passage 110.

Figure 10:
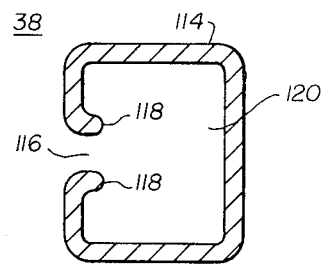
FIG. 10 is a front elevation, in section, of the muzzle portion of FIG. 9 taken along line 10—10.

If it is desired to place a conductor within a connector placed within the longitudinal passage of the tool 38 and have the same proceed through the tool 38 muzzle as the connector is extruded therethrough it is necessary that a slot 116 be positioned communicating with the longitudinal passage (not shown) and then to the transverse passage 72. In this manner a connector placed through the transverse passage 72 and a conductor also placed therein and placed through the connector and extruded, may proceed through the slot 116 and exit through the end aperture 120 as is better seen in FIG. 10. Further, it can be seen from FIG. 10 that the protrusions 118 form the extrusion in the connector area adjacent the slot 116. Further, with this arrangement, it is possible to insert a pin or conductor via end aperture 120 and a further conductor via transverse passage 72 into a connector in the longitudinal passage. The resulting connection will be a head to toe, overlapped joint.

Figure 11:
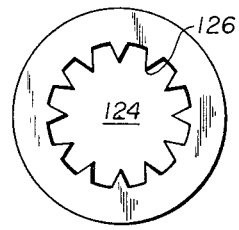
FIG. 11 is a front elevation of a further modification of the muzzle portion of tool of FIG. 4.

Additionally, if it is desired, a number of discreet protrusion areas may be provided within the longitudinal passage 124. A plurality of protrusions 126 spaced about the inner surface of longitudinal surface 124 may be provided as is shown in FIG. 11. Also, if desired protrusions 126 may be spaced along the entire inner surface of the longitudinal passage 124 or only along a portion of the inner circumference of the longitudinal passage 124.

I claim:

1. An extrusion tool for joining an article to a further article comprising: a housing having a longitudinal passage therethrough; at least one protrusion mounted adjacent a first end of said longitudinal passage, said protrusion extending into said longitudinal passage partially blocking same; a plunger having a selectively compressible end portion and positioned in said longitudinal passage intermediate the ends thereof, said end portion compressing under the influence of said protrusion as said end portion is moved into engagement with said protrusion and expanding to its uncompressed state as said plunger is moved away from said protrusion; said housing further having a transverse passage extending from the outside of said housing to and communicating with said longitudinal passage for placing articles within said longitudinal passage between said plunger and said protrusion, and an aperture in the end of said housing communicating with said longitudinal passage whereby further articles may be inserted through said longitudinal passage; a movable handle coupled to said housing for movement relative thereto; coupling means coupled to said movable handle and said plunger for movement of said plunger within said longitudinal passage towards and away from said protrusion; said plunger when moved by said movable handle towards said protrusion forcing an article placed in said longitudinal passage against said protrusion and causing said article to close about a further article placed in said longitudinal passage.

2. A tool, as defined in claim 1, wherein said plunger has a split end portion, said end portion compressing under the influence of said protrusion as said plunger end portion is moved into engagement with said protrusion and expanding as said plunger is moved away from said protrusion by said movable handle.

3. A tool, as defined in claim 1, wherein there is a plurality of protrusions in said longitudinal passage adjacent a first end of said longitudinal passage and extending along at least a portion of the circumference thereof.

4. A tool, as defined in claim 1, wherein there is a plurality of protrusions in said longitudinal passage adjacent a first end of said longitudinal passage and extending along the entire circumference thereof.

5. A tool, as defined in claim 1, wherein there are two protrusions in said longitudinal passage adjacent a first end of said longitudinal passage.

6. A tool, as defined in claim 1, wherein said protrusion is a smooth surface at a first end of said longitudinal passage extending along at least a portion of the circumference thereof.

7. A tool, as defined in claim 1, wherein said protrusion is a smooth surface at a first end of said longitudinal passage extending along the entire circumference thereof.

8. A tool, as defined in claim 1, wherein said longitudinal passage is rectangular and said protrusions extend along at least one side of said longitudinal passage.

9. A tool, as defined in claim 1, wherein said longitudinal passage is rectangular and said protrusions extend along two sides of said longitudinal passage.

10. A tool, as defined in claim 1, wherein said longitudinal passage is rectangular and said protrusions extend along all four sides of said longitudinal passage.

11. A tool, as defined in claim 1, wherein said housing further comprises a slot extending from the outside of said housing to and communicating with both longitudinal and transverse passages whereby further articles may be inserted through said slot into an article inserted through said transverse passage.

References Cited

UNITED STATES PATENTS

| | | | |
|---|---|---|---|
| 2,773,283 | 12/1956 | Malamoud et al. | 18—13 D |
| 1,819,254 | 8/1931 | Mantle | 72—257 |
| 429,255 | 6/1890 | Bishop | 18—13 A |
| 2,384,224 | 9/1945 | Williams | 18—59 A |
| 2,591,062 | 4/1952 | Gillett | 29—203 D |
| 3,559,270 | 2/1971 | Beghi | 72—253 |

FOREIGN PATENTS

| | | | |
|---|---|---|---|
| 405,879 | 2/1934 | Great Britain | 72—253 |

MILTON S. MEHR, Primary Examiner

U.S. Cl. X.R.

29—203, 517; 72—253